(12) United States Patent
Yang

(10) Patent No.: US 8,800,281 B2
(45) Date of Patent: Aug. 12, 2014

(54) HEAT ENGINE

(76) Inventor: Yongshun Yang, Urumqi (CN)

( * ) Notice: Subject to any disclaimer, the term of this patent is extended or adjusted under 35 U.S.C. 154(b) by 222 days.

(21) Appl. No.: 13/518,165

(22) PCT Filed: May 21, 2010

(86) PCT No.: PCT/CN2010/000731
§ 371 (c)(1),
(2), (4) Date: Jun. 21, 2012

(87) PCT Pub. No.: WO2011/075930
PCT Pub. Date: Jun. 30, 2011

(65) Prior Publication Data
US 2012/0260648 A1 Oct. 18, 2012

(30) Foreign Application Priority Data

Dec. 22, 2009 (CN) .......................... 2009 1 0113596

(51) Int. Cl.
*F01B 29/10* (2006.01)
*F02G 1/04* (2006.01)
*F16H 21/22* (2006.01)

(52) U.S. Cl.
USPC .................................. 60/525; 60/517; 74/45

(58) Field of Classification Search
USPC .................................. 60/516–526; 74/24–62
See application file for complete search history.

(56) References Cited

U.S. PATENT DOCUMENTS

| | | | |
|---|---|---|---|
| 4,138,897 A | * | 2/1979 | Ross .................................. 74/45 |
| 4,532,819 A | * | 8/1985 | Ross .................................. 74/44 |
| 4,738,105 A | * | 4/1988 | Ross et al. ....................... 60/517 |
| 5,146,749 A | | 9/1992 | Wood et al. |
| 8,474,256 B2 | * | 7/2013 | Kamen et al. ................... 60/525 |

FOREIGN PATENT DOCUMENTS

| | | |
|---|---|---|
| CN | 86100467 A | 7/1986 |
| CN | 101096913 A | 1/2008 |
| CN | 101265856 A | 9/2008 |
| DE | 4320356 A1 | 12/1994 |
| WO | 97/03283 A1 | 1/1997 |

OTHER PUBLICATIONS

International Search Report for International Application No. PCT/CN2010/000731, mailed Sep. 23, 2010, with English translation.

* cited by examiner

*Primary Examiner* — Kenneth Bomberg
*Assistant Examiner* — Christopher Jetton
(74) *Attorney, Agent, or Firm* — Cantor Colburn LLP

(57) ABSTRACT

A heat engine includes four groups of cylinder assemblies and a transmission output mechanism. The transmission output mechanism includes a rocker-arm shaft support, a crankshaft support, a first rocker-arm assembly, a second rocker-arm assembly, and a crankshaft rotatablely installed on the crankshaft support. A crankshaft long-arm connecting rod and a crankshaft short-arm connecting rod are hinged on the crankshaft. The first rocker-arm assembly includes a first straight shaft, a first long arm and a second long arm, and a first hinged part is arranged on the second long arm to hinge with the crankshaft long-arm connecting rod. The second rocket-arm assembly includes a second straight shaft, a third long arm and a fourth long arm and a short arm. A second hinged part is arranged on the short arm to hinge with the crankshaft short-arm connecting rod. The crankshaft long-arm connecting rod is parallel with the short arm and the crankshaft short-arm connecting rod is parallel with the second long arm. The heat engine is simple in structure, has low manufacturing cost and makes less noise.

8 Claims, 7 Drawing Sheets

HEAT ENGINE

CROSS REFERENCE TO RELATED APPLICATIONS

This is a U.S. national stage of application No. PCT/CN2010/000731, filed on 21 May 2010. Priority under 35 U.S.C. §119(a) and 35 U.S.C. §365(b) is claimed from Chinese Application No. 200910113596.5, filed 22 Dec. 2009, the disclosure of which are also incorporated herein by reference.

TECHNICAL FIELD

The present invention relates to a heat engine.

BACKGROUND ART

The heat engine is a closed-cycle reciprocating engine with periodic contraction and expansion by external heat supply.

As shown in FIG. 1, the first traditional type of four-cylinder dual-piston coaxial ventilation engine includes four cylinder-assemblies and a transmission output mechanism for transmitting and outputting power.

The four cylinder-assemblies have the same structure. Along clockwise direction or counter-clockwise direction, the first cylinder-assembly is numbered as A, the second cylinder-assembly is numbered as B, the third cylinder-assembly is numbered as C, and the fourth cylinder-assembly is numbered as D. Four cylinders of the four cylinder-assemblies are respectively arranged at four vertices of a square.

The first cylinder assembly A includes a top-opening and bottom-sealing cylinder, a heater 17A, a regenerator 18A and a cooler 19A connected in turn. A sealing separator 11A is fixed at the middle position of the cylinder and separates the cylinder into two portions including a scavenging cylinder 12A and a working cylinder 13A. A scavenging piston 14A is positioned in the scavenging cylinder 12A. No gap is between the scavenging piston 14A and the inside wall of the scavenging cylinder, or there is a small gap for gas lubrication. A working piston 15A is positioned in the working cylinder 13A, there is no gap between the working piston 15A and the working cylinder 13A. A rod 16A is pivotally connected onto the working piston 15A. A space between the working piston 15A and the sealing separator 11A is named as working-cylinder seal chamber 131A. A piston rod passes through a seal hole of the sealing separator 11A and then connects the scavenging piston 14A with the working piston 15A. The heater 17A can be communicated with the lower terminal of the scavenging cylinder 12A directly or through a heating pipeline 20A. The heater 17A is applied to heat the lower terminal of the scavenging cylinder 12A to form a heat terminal 122A and to keep the heat terminal 122A in a high-temperature state. The cooler 19A is communicated with the upper terminal of the scavenging cylinder 12A directly or through a cooling pipeline 21A. The cooler 19A is applied to cool the upper terminal of the scavenging cylinder 12A to form a cool terminal 121A and to keep the cool terminal 121A in a low-temperature state. In general, as far as a temperature difference between the heat terminal 122A and the cool terminal 121A is concerned, the larger the better.

The three other cylinder assemblies have the same structure as the first cylinder assembly. For convenience of description, the different cylinder assembly is numbered with a different suffix letter, i.e., the second cylinder assembly is numbered with a suffix letter B, the third cylinder assembly is numbered with a suffix letter C, and the fourth cylinder assembly is numbered with a suffix letter D.

The cool terminal 121A of the scavenging cylinder 12A in the first cylinder assembly A is communicated with the lower terminal of the working-cylinder seal chamber 131B in the second cylinder assembly B through a first intercommunicating pipeline 10A. The cool terminal 121B of the scavenging cylinder 12B in the second cylinder assembly B intercommunicates with the lower terminal of the working-cylinder seal chamber 131C in the third cylinder assembly C through a second intercommunicating pipeline 10B. The cool terminal 121C of the scavenging cylinder 12C in the third cylinder assembly C intercommunicates with the lower terminal of the working-cylinder seal chamber 131D in the fourth cylinder assembly D through a third intercommunicating pipeline 10C. The cool terminal 121D of the scavenging cylinder 12D in the fourth cylinder assembly D intercommunicates with the lower terminal of the working-cylinder seal chamber 131A in the third cylinder assembly A through a fourth intercommunicating pipeline 10D. A phase difference between two pistons of two adjacent cylinder assemblies is 90 degrees, and the phase difference between to two pistons of two cylinder assemblies in a diagonal position is 180 degrees.

This traditional four-cylinder dual-piston coaxial ventilation heat engine operates in principle of gas expansion caused by heat and gas contraction caused by cold. After gas pipelines of four cylinder assemblies have been intercommunicated with each other, a certain amount of gas is sealed in the working cylinder below the working piston in each one cylinder assembly and also in the scavenging cylinder in the adjacent cylinder assembly intercommunicating therewith. The gas is transmitted between the cool terminal and heat terminal of the scavenging cylinder, and thus a whole temperature of the gas is changed. When the scavenging piston is located in the middle position of the scavenging cylinder, the gas volume in the cool terminal of the scavenging cylinder is equal to that in the heat terminal of the scavenging cylinder. At the moment, an average temperature of all gas in the scavenging cylinder is equal to a preset value P. When the average temperature of all gas in the scavenging cylinder is higher than the preset value P, gas expands to do work. When the average temperature of all gas in the scavenging cylinder is lower than the preset value P, gas contracts to do work.

As shown in FIGS. 1 and 1A, when the working piston 15A of the first cylinder assembly A is located at TDC (Top Dead Center), the scavenging piston 14A is located at the upper terminal of scavenging cylinder 12A. When the working piston 15C of the third cylinder assembly C is located at BDC (Bottom Dead Center), the scavenging piston 14C is located at the lower terminal of the scavenging cylinder 12C. When the working pistons 15B and 15D are correspondingly located in the middle positions of the second cylinder assembly B and the fourth cylinder assembly D, the scavenging pistons 14B and 14D are correspondingly located in the middle positions of the scavenging cylinders 12B and 12D.

When the scavenging piston 14A of the first cylinder assembly A is located at the cool terminal 121A of the scavenging cylinder 12A, the gas volume in the heat terminal of the scavenging cylinder 12A is bigger than that in the cool terminal thereof due to the scavenging piston 14A occupying a certain of space. Thereby, the average temperature of all gas in the scavenging cylinder 12A is higher than the preset value P, resulting in gas expansion. The expanded gas passes through the heating pipeline 20A, the heater 17A, the regenerator 18A, the cooler 19A and the first cooling pipeline 21A in sequence, and is supplied to the cool terminal 121A of the scavenging cylinder 12A in the first cylinder assembly A. At the same time, the gas in the cool terminal 121A in the first cylinder assembly A passes through the first intercommunicating pipeline 10A, is supplied to the seal chamber 131B of the working cylinder 13B in the second cylinder assembly B, and further pushes the working piston 15B upward for doing work. During the whole process that the scavenging piston 14A in the first cylinder assembly A is pushed downward from the cool terminal 121A to the middle position thereof, the average gas temperature in the scavenging cylinder 12A can be kept higher than the preset value P, the gas can keep doing work. Expect for the moment that the scavenging piston 14A is located at the middle position of the scavenging cylinder 12A, the average gas temperature thereof is equal to the preset value P and the gas in the working cylinder 13B cannot do work.

When the scavenging piston 14A in the first cylinder assembly A is pushed downward to the middle position thereof, the working piston 15B in the second cylinder assembly B is pushed upward to TDC by gas expansion. Under adjusting control of transmission output mechanism, the scavenging piston 14C and the working piston 15C in the third cylinder assembly C move upward to the middle position thereof, the scavenging piston 14D in the fourth cylinder assembly D moves downward to lower terminal of the scavenging cylinder and the working piston 15D moves downward to BDC. When the scavenging piston 14A in the first cylinder assembly A continues moving downward from the middle position of the scavenging cylinder 12A and occupies the volume in heat terminal 122A of the scavenging cylinder 12A, the average gas temperature in the scavenging cylinder 12A is lower than the preset value P. During the process that the scavenging piston 14A moves downward from the middle position to the lower terminal of the scavenging cylinder 12A, the average gas temperature in the scavenging cylinder 12A is kept lower than the present value P, resulting in gas contraction and negative pressure in the scavenging cylinder 12A. Under external pressure of the working cylinder 13B, the working piston 15B in the second cylinder assembly B moves downward from TDC to the middle position. Meanwhile, under adjusting control of transmission output mechanism, the scavenging piston 14C in the third cylinder assembly C moves upward to the upper terminal of the scavenging cylinder 12C, the working piston 15C moves upward until TDC, the scavenging piston 14D and the working piston 15D in the fourth cylinder assembly D moves upward to the middle position thereof.

The process of the scavenging piston 14A in the first cylinder assembly A moving upward from the lower terminal to the upper terminal of the scavenging cylinder 12A is opposite to that from the upper terminal to the lower terminal described above, which is not repeated herein. It should be noted that the scavenging piston 14A in the first cylinder assembly A passes the middle position of the scavenging cylinder 12A twice, in one cycle between the upper terminal and the lower terminal. As mentioned above, when the scavenging piston 14A is located in the middle position of the scavenging cylinder 12A, the average gas temperature in the scavenging cylinder 12A is equal to P, without the gas expansion and contraction. Hence, how does the scavenging piston 14A pass by the middle position and continue moving upward or downwards? Due to the phase difference of 90 degrees between two pistons of two adjacent cylinder assemblies, when the scavenging piston 14A in the first cylinder assembly A is located in the middle position of the scavenging cylinder 12A, and then the working piston 15D in the fourth cylinder assembly D is located at TDC or BDC of the working cylinder 13D, the scavenging piston 14D is located at the upper terminal or the lower terminal of the scavenging cylinder 12D, resulting in the gas expansion or contraction under the average temperature of all gas in the scavenging cylinder 12D of the fourth cylinder assembly D being higher or lower than the preset value P of the average temperature. Through the intercommunicating pipeline between the cool terminal 121D of the scavenging 12D in the fourth cylinder assembly D and the seal chamber 131A of the working cylinder 13A in the first cylinder assembly A, the working piston 15A in the first cylinder assembly A passes by the middle position and moves upward or downward, depending on the gas expansion or contraction in the scavenging cylinder 12D in the fourth cylinder assembly. The work principle of the other cylinders is the same. Thus, the four cylinder assemblies of the four-cylinder dual-piston coaxial ventilation heat engine can operate smoothly and continually under adjusting control of transmission output mechanism.

It is obviously shown in FIG. 1A that the gas doesn't work, only when the all working pistons are located at TDC or BDC and the scavenging pistons cooperating therewith are located at the middle position, but the gas still does work when the pistons are located at the other oppositions.

Crankshaft of the four-cylinder dual-piston coaxial ventilation heat engine shown in FIG. 1 can be provided with a flywheel. Due to rotational inertia of the flywheel, the scavenging pistons in the all cylinder assemblies pass by the middle position more smoothly and thereby the heat engine can operate more stably and more reliably.

The second traditional type of four-cylinder dual-piston coaxial ventilation heat engine is shown in FIG. 2. The differences between the second traditional four-cylinder dual-piston coaxial ventilation heat engine and the first one is that: there is a gap between the scavenging piston and the inside wall of the scavenging cylinder, allowing gas to pass through; there is no pipeline between the heat terminal and cool terminal of the scavenging cylinder in the same cylinder assembly, but there is pipeline between the cool terminal of the scavenging cylinder in the former cylinder assembly and the seal chamber of the working cylinder in the adjacent latter cylinder assembly. For example, there is the intercommunicating pipeline 10A between the cool terminal 121A of the scavenging cylinder in the first cylinder assembly and the seal chamber 131B in the second cylinder assembly, but there is no intercommunicating pipeline between the cool terminal 121A and the heat terminal 122A of the scavenging cylinder in the first cylinder assembly. During the process that the scavenging piston moves upward and downward in the scavenging cylinder, the gas moves to and fro between the cool terminal and the heat terminal in the scavenging cylinder through the gap between the scavenging piston and the inside wall of the scavenging cylinder. The second type of four-cylinder dual-piston coaxial ventilation heat engine has the same work principle as that of the first type of four-cylinder dual-piston coaxial ventilation heat engine, which is omitted for clarity.

As shown in FIG. 3, a traditional double-acting heat engine includes four cylinder assemblies and the transmission output mechanism for transmitting and outputting power.

The four cylinder-assemblies have the same structure. Along clockwise direction or counter-clockwise direction, the first cylinder-assembly is numbered as E, the second cylinder-assembly is numbered as F, the third cylinder-assembly is numbered as G, and the fourth cylinder-assembly is numbered as H. Four cylinders of the four cylinder-assemblies are respectively arranged at four vertices of a square.

The first cylinder assembly E includes a cylinder 20E with two ends sealed by a seal cover, and a first heater 22E, a first regenerator 23E and a first cooler 24E connected in turn. A piston 21E is positioned in the cylinder 20E, without a gap between the piston 21E and the cylinder 20E for gas passing through. A piston rod 25E passes through a seal hole of the seal cover, then one end of the piston rod 25E rigidly is connected to the piston 21E and the other end thereof pivotally connected to the rod 26E. The heater 22E can be communicated with the lower terminal of the cylinder 20E directly or through a pipeline, so as to form a heat terminal 202E in the cylinder 20E and keep the heat terminal 202E in a high-temperature state. The cooler 24E is communicated with the upper terminal of the cylinder 20F directly or through a pipeline, so as to form a cool terminal 201F in the cylinder 20F and keep the cool terminal 201F in a low-temperature state. The cooler 24H in the fourth cylinder assembly H is communicated with the upper terminal of the fist cylinder assembly E directly or through a pipeline, so as to form a cool terminal 201E and keep the cool terminal 201E in a low-temperature state. In operation, as far as a temperature difference between the heat terminal and the cool terminal is concerned, the larger the better.

Each of the second cylinder assembly F, the third cylinder assembly G and the fourth cylinder assembly H has the same structure as that of the first cylinder assembly. The upper terminal of the cylinder in the cylinder assembly is intercommunicated with the cooler in the adjacent cylinder assembly to form a cool terminal of the cylinder, and a phase difference between two pistons of two adjacent cylinder assemblies is 90 degrees.

The heat terminal 202E in the first cylinder assembly E is intercommunicated with the cool terminal 201F in the second cylinder assembly F through heater 22E, regenerator 23E and cooler 24E. The first power cycle mechanism consists of the piston 21E, the heat terminal 202E, the heater 22E, the regenerator 23E, the cooler 24E in the first cylinder assembly E, and the cool terminal 201F, the piston 21F in the second cylinder assembly F. The heat terminal 202F in the second cylinder assembly F is intercommunicated with the cool terminal 201G in the third cylinder assembly G through heater 22F, regenerator 23F and cooler 24F. The second power cycle mechanism consists of the piston 21F, the heat terminal 202F, the heater 22F, the regenerator 23F, the cooler 24F in the second cylinder assembly F, and the cool terminal 201G, the piston 21G in the third cylinder assembly G. The heat terminal 202G in the third cylinder assembly G is intercommunicated with the cool terminal 201H in the fourth cylinder assembly H through heater 22G, regenerator 23G and cooler 24G. The third power cycle mechanism consists of the piston 21G, the heat terminal 202G, the heater 22G, the regenerator 23G, the cooler 24G in the third cylinder assembly G, and the cool terminal 201H, the piston 21H in the fourth cylinder assembly H. The heat terminal 202H in the fourth cylinder assembly H is intercommunicated with the cool terminal 201E in the first cylinder assembly E through heater 22H, regenerator 23H and cooler 24H. The fourth power cycle mechanism is consisted of the piston 21H, the heat terminal 202H, the heater 22H, the regenerator 23H, the cooler 24H in the third cylinder assembly H, and the cool terminal 201E, the piston 21E in the fourth cylinder assembly E. The four power cycle mechanisms are utilized as four double-acting heat engine, with the more compact structure, the smaller whole volume and the less mass.

In the same power cycle mechanism, when the heat terminal side in one piston moves in an opposite direction to that of the cool terminal side in another piston, the quick expansion or contraction of sealed gas pushes the piston to do work. When the heat terminal side in one piston moves in the same direction as that of the cool terminal side in another piston, the sealed gas quickly moves between the heat terminal in one cylinder and the cool terminal in another cylinder, and the piston doesn't do work.

As shown in FIG. 3 and FIG. 3A, the piston 21E in the first power cycle mechanism is located at TDC, the piston 21G in the third power cycle mechanism is located at BDC, the pistons 21F and 21H in the second and the fourth power cycle mechanism are located at the middle position.

In the first power cycle mechanism, under the inertia effect of the flywheel, the crankshaft rotates through 90 degrees, to drive the heat terminal side of the piston 21E move downward to the middle position and to drive the cool terminal side of the piston 21F move downward to BDC. The movement direction of the heat terminal side of the piston 21E is the same as that of the cool terminal side of the piston 21F, therefore the piston 21E and 21F doesn't do work during the phase of 0 to 90 degrees, the gas in the heat terminal 202E of the cylinder assembly E moves into the cool terminal 201F of the cylinder assembly F.

When the piston 21E is located in the middle position and the piston 21F is located at BDC, there is more sealed gas in the cool terminal 201F of the first power cycle mechanism. Therefore, during the phase of 90-180 degrees, the gas contraction results in the movement of two pistons to reduce gas volume. That is, the gas contraction drives the heat terminal 202E side of the piston 21E to move downward from the middle position to BDC and drive the cool terminal 201F side of the piston 21F move upward from BDC to the middle position. In the meanwhile, the pistons 21E and 21F do work to outside through the piston rods respectively.

Under the inertia effect of the flywheel, the crankshaft rotates to drive the heat terminal 202E side of the piston 21E move upward from BDC to the middle position and to drive the cool terminal 201F side of the piston 21F move upward from the middle position to TDC. The movement direction of the heat terminal 202E side of the piston 21E is the same as that of the cool terminal 201F side of the piston 21F, therefore the pistons 21E and 21F don't do work during the phase of 180 to 270 degrees, the gas in the cool terminal 201F of the cylinder assembly F moves into the heat terminal 202E of the cylinder assembly E.

When the piston 21E is located in the middle position and the piston 21F is located at TDC, there is more sealed gas in the heat terminal 202E of the first power cycle mechanism. Therefore, during the following phase of 270 to 360 degrees, the gas expansion results in the movement of two pistons to increase gas volume. That is, the gas expansion drives the heat terminal 202E side of the piston 21E to move upward from the middle position to TDC and drive the cool terminal 201F side of the piston 21F move downward from TDC to the middle position. In the meanwhile, the pistons 21E and 21F do work to outside through the piston rods respectively.

As a result, during one cycle of the heat terminal 202E side of the piston 21E in the first power cycle mechanism moving from TPC through the middle position to BPC and from BPC through the middle position to TPC, there are one gas contraction working process, one gas expansion working process and two gas transmission processes. During one cycle of the cool terminal 201F side of the piston 21F in the first power cycle mechanism moving from the middle position through BPC to the middle position and from the middle position through TPC to the middle position, there are one gas contraction working process, one gas expansion working process and two gas transmission processes.

During the gas transmission in a phase from 0 to 90 degrees in the first power cycle mechanism, the operation of the second, third and fourth power cycle mechanism are as follows: the second power cycle mechanism operates in the gas contraction process, driving the heat terminal side of the piston 21F move downward from the middle position to BDC and driving the cool terminal side of the piston 21G move upward from BPC to the middle position; the third power cycle mechanism operates in the gas transmission process, in which, under the inertia effect of the flywheel, the heat terminal side of the piston 21G is driven to move upward to the middle position, and the cool terminal side of the piston 21H) is driven to move upward to TDC; the fourth power cycle mechanism operates in the gas contraction process, in which the heat terminal side of the piston 21H is driven to move upward to TDC, and the cool terminal side of the piston 21E is driven to move downward to the middle position.

The operation of the first power cycle mechanism is described in detail above, and the cooperation of four power cycle mechanisms in the double-acting heat engine is as the following: when the crankshaft is in the phase of 0-90 degrees, the gas in the first power cycle mechanism is in the gas transmission process, the gas in the second power cycle mechanism is in the gas contraction process, the gas in the third power cycle mechanism is in the gas transmission process, and the gas in the fourth power cycle mechanism is in the gas expansion process; when the crankshaft is in the phase of 90-180 degrees, the gas in the first power cycle mechanism is in the gas contraction process, the gas in the second power cycle mechanism is in the gas transmission process, the gas in the third power cycle mechanism is in the gas expansion process, and the gas in the fourth power cycle mechanism is in the gas transmission process; when the crankshaft is in the phase of 180-270 degrees, the gas in the first power cycle mechanism is in the gas transmission process, the gas in the second power cycle mechanism is in the gas expansion process, the gas in the third power cycle mechanism is in the gas transmission process, and the gas in the fourth power cycle mechanism is in the gas contraction process; when the crankshaft in the phase of 270-360 degrees, the gas in the first power cycle mechanism is in the gas expansion process, the gas in the second power cycle mechanism is in the gas transmission process, the gas in the third power cycle mechanism is in the gas contraction process, and the gas in the fourth power cycle mechanism is in the gas transmission process. So, the four power cycle mechanisms of the double-acting heat engine can operate continually and smoothly.

When the four cylinder assemblies operate properly, a transmission output mechanism is required to adjust the work phases of all pistons in the cylinders and to output power. As shown in FIG. 4, the traditional transmission output mechanism of the heat engine includes an output gear 30, and a first drive gear 31 and a second drive gear 32 engaging with the output gear 30 respectively. The first drive gear 31 is connected with a first crankshaft 33 including two crank portion 331, each rod journal is connected with a rod (not shown). The second drive gear 32 is connected with a second crankshaft 34 including two rod journals 341, each rod journal is connected with a rod (not shown). Two crankshafts 33 and 34 are connected with four rods in total, the four rods are respectively pivotally connected with the rods of four cylinder assemblies. Consequently, the reciprocation of the four rods is transmitted by the crankshaft, the drive gear and the output gear 30 in turn, and finally the power is outputted from the output gear 30.

However, due to complex structure, high manufacturing cost and high requirement to operative lubrication of gear drive mechanism, operation cost of the whole engine is high. Additionally, the gear drive mechanism operates noisily.

There is also an attempt to achieve output power by a swash plate structure, which has the same problems, such as high requirement to lubrication, high operation cost and high noise.

SUMMARY OF THE INVENTION

The present invention is to solve the problems in the transmission output mechanism of the traditional heat engine, such as high cost and high noise.

To solve the above technical problem, the present invention provides a heat engine as follows.

A heat engine may comprise four cylinder-assemblies and a transmission output mechanism for transmitting and outputting power, the transmission output mechanism comprising a rocker-arm shaft support, a crankshaft support, a first rocker-arm assembly, a second rocker-arm assembly, and a crankshaft rotatablely mounted to the crankshaft support, wherein the crankshaft is pivotally connected with a crankshaft long-arm connecting rod and a crankshaft short-arm connecting rod. A first rocker-arm assembly may comprise a first straight shaft with a length approximately equal to a distance between centers of two adjacent cylinders, a first long arm and a second long arm respectively with a length equal to or longer than half length of the first straight shaft, wherein the first long arm and the second long arm are perpendicular to the first straight shaft and positioned at two sides of the first straight shaft, one end of the first long arm and one end of the second long arm are fixedly connected to two ends of the first straight shaft respectively and the other ends thereof are pivotally connected to two rods of two cylinder assemblies at one diagonal respectively, an angle between the first long arm and the second arm is in a range of 120 to 240 degrees. The second long arm may be provided with a first hinged part for pivotally connecting the crankshaft long-arm connecting rod. A second rocker-arm assembly may comprise a second straight shaft with a length approximately equal to a distance between centers of two adjacent cylinders, a third long arm and a fourth long arm respectively with a length equal to or longer than half length of the second straight shaft, and a short arm with a length equal to or shorter than half length of the second straight shaft, wherein the third long arm and the fourth long arm are perpendicular to the second straight shaft and positioned at two sides of the second straight shaft, one end of the third long arm and one end of the fourth long arm are fixedly connected to two ends of the second straight shaft and the other ends thereof are pivotally connected to two rods of two cylinder assemblies at the other diagonal respectively, an angle between the third long arm and the fourth arm is in a range of 120 to 240 degrees. One end of the short arm is in fixed connection with connection part of the third long arm and the second straight shaft, the other end of the short arm is provided with a second hinged part for pivotally connecting the crankshaft short-arm connecting rod. A distance between the first hinged part of the first rocker-arm assembly and the first straight shaft is equal to that between the second hinged part of the second rocker-arm assembly and the second straight shaft. The first straight shaft of the first rocker-arm assembly and the second straight shaft of the second rocker-arm assembly are parallel to each other and are rotatablely mounted to the rocker-arm shaft support, the crankshaft long-arm connecting rod is parallel to the short arm, and the crankshaft short-arm connecting rod is parallel to the second long arm.

In the mentioned-above heat engine, one of the first straight shaft and the second straight shaft may be a hollow tube rotatablely sleeved on the other thereof, two ends of the other thereof extending out of the hollow tube.

In the mentioned-above heat engine, an angle between the first long arm and the second long arm is in a range of 160 to 220 degrees, an angle between the third long arm and the fourth long arm is in a range of 160 to 220 degrees.

In the mentioned-above heat engine, the crankshaft may be installed upon or under said rocker-arm assembly.

In the mentioned-above heat engine, the heat engine further may include a sealed enclosure filled with a certain pressure of gas, wherein the heat engine is positioned in the enclosure.

In light of the above technical solution, the present heat engine, mainly constituted of a number of rods and a crankshaft, has simple structure and low manufacturing cost. In the meanwhile, the transmission output mechanism transmits the cycle power produced by the four cylinder assemblies through the first and second rocker-arm assemblies to the crankshaft and then to outside, no requirement to complex lubrication will further reduce operation cost. Additionally, less noise is produced during the operation of the transmission output mechanism consisting of the rods.

Many advantages and spirits of the invention can be better understood with references to the following drawings and interpretation.

DETAILED DESCRIPTION OF THE PREFERRED EMBODIMENTS

In the present invention, a heat engine includes four cylinder assemblies and four transmission output mechanisms for transmitting and outputting power.

The structures of four cylinder assemblies and the connection between the adjacent cylinder assemblies in the present invention are the same as the conventional structure described above, and are omitted for clarity.

Figure 5:
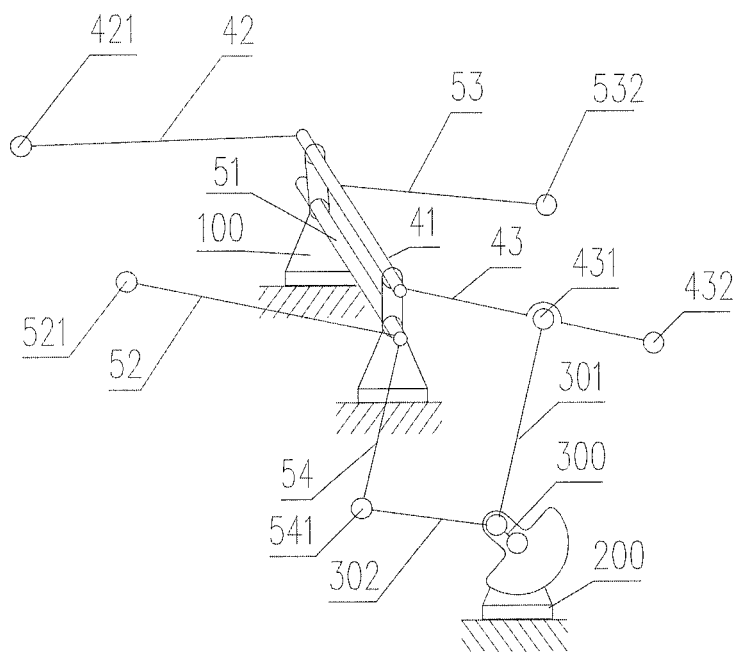
FIG. 5 shows a schematic view of a first embodiment of the transmission output mechanism of the heat engine in the present invention.
Figure 6:
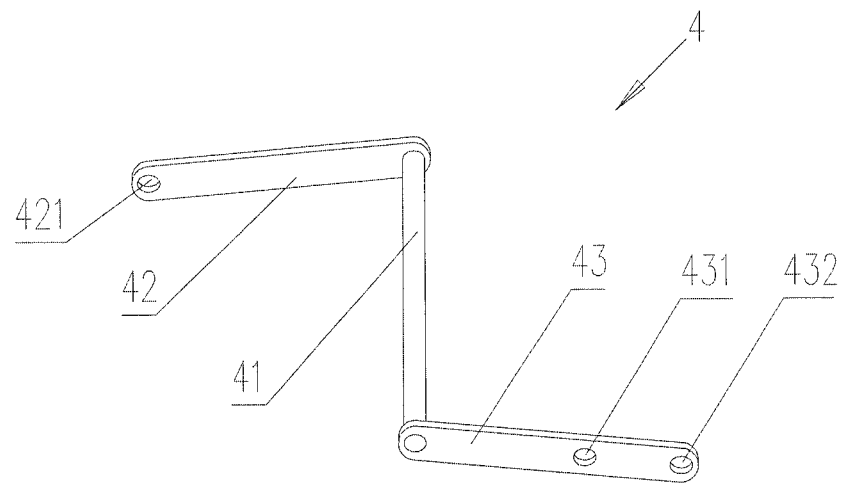
FIG. 6 is a schematic view of a first rocker-arm in the first embodiment of the transmission output mechanism shown in FIG. 5.
Figure 7:
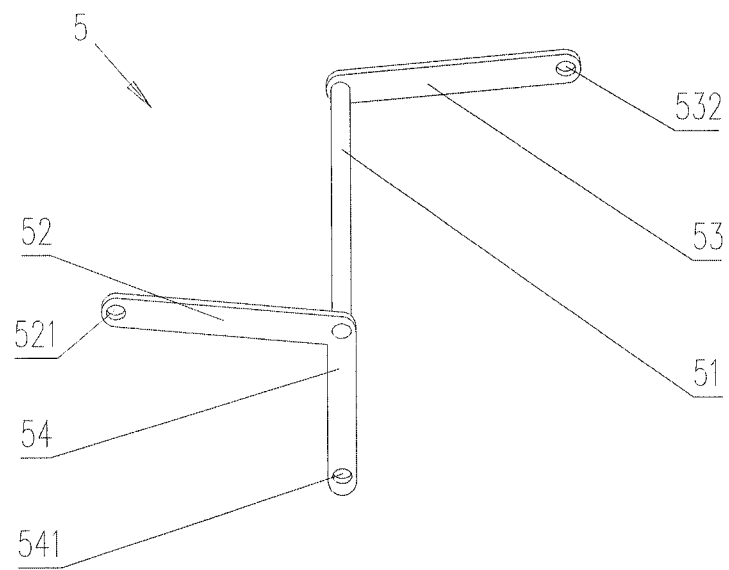
FIG. 7 is a schematic view of a second rocker-arm in the first embodiment of the transmission output mechanism shown in FIG. 5.

As shown in FIGS. 5 to 7, the first embodiment of a transmission output mechanism in the heat engine of the present invention includes a rocker-arm shaft support 100, a crankshaft support 200, a first rocker-arm assembly 4, a second rocker-arm assembly 5, and a crankshaft 300 rotatablely connected to the crankshaft support. The crankshaft 300 is pivotally connected with a crankshaft long-arm connecting rod 301 and a crankshaft short-arm connecting rod 302.

The first rocker-arm assembly 4 includes a first straight shaft 41, a first long arm 42 and a second long arm 43. The length of the first straight shaft 41 is approximately equal to the distance between the centers of two adjacent cylinders, the length of the first long arm 42 or the second long arm 43 is equal to or longer than the half length of the first straight shaft 41. The first long arm 42 and the second long arm 43 are perpendicular to the first straight shaft 41 and are positioned at two sides of the first straight shaft 41. One end of the first long arm 42 and one end of the second long arm 43 are fixedly connected to two ends of the first straight shaft 41 respectively, and the other ends thereof are respectively provided with a third hinged part 421 and a fourth hinged part 432 for pivotally connecting two rods of the cylinder assemblies A and C. An angle between the first long arm 42 and the second long arm 43 is 200 degrees (but not limited to this). The angle may be in a range of 120 to 240 degrees, and preferably in a range of 160 to 220 degrees. The second long arm 43 is provided with a first hinged part 431 for pivotally connecting the crankshaft long-arm connecting rod 301.

The second rocker-arm assembly 5 includes a second straight shaft 51, a third long arm 52, a fourth long arm 53 and a short arm 54. The length of the second straight shaft 51 is approximately equal to the distance between the centers of two adjacent cylinders, the length of the third long arm 52 or the fourth long arm 53 is equal to or longer than the half length of the second straight shaft 41, the length of the short arm 54 is equal to or shorter than the half length of the second straight shaft 51. The third long arm 52 and the fourth long arm 53 are vertical to the second straight shaft 51 and are positioned at two sides of the second straight shaft 51. One end of the third long arm 52 and one end of the fourth long arm 53 are connected to two ends of the second straight shaft 51 respectively, and the other ends thereof are provided with a fifth hinged part 521 and a sixth hinged part 532 for pivotally connecting two rods of the cylinder assemblies B and D. An angle between the third long arm 52 and the fourth long arm 53 is 200 degrees (but not limited to this). The angle may be in a range of 120 to 240 degrees, and preferably in a range of 160 to 220 degrees. One end of the short arm 54 is in fixed connection with the connected part of the third long arm 52 and the second straight shaft 51, the other end of the short arm 54 is provided with the second hinged part 541 pivotally connected to the crankshaft short-arm connecting rod 302. The distance between the first hinged part 431 of the first rocker-arm assembly 4 and the first straight shaft 41 is equal to that between the second hinged part 541 of the second rocker-arm assembly 5 and the second straight shaft 51.

The first straight shaft 41 of the first rocker-arm assembly 4 is parallel to the second straight shaft 51 of the second rocker-arm assembly 5. The first and second straight shafts 41, 51 are rotatablely and horizontally installed to the rocker-arm shaft support 100, such as through bearing or other similar means. After the installation of all parts in the transmission output mechanism is done, the crankshaft long-arm connecting rod 301 is parallel to the short arm 54, and the crankshaft short-arm connecting rod 302 is parallel to the second long arm 43. The crankshaft 300 can be installed upon or under the rocker-arm assembly.

This embodiment of the heat engine further includes a sealed enclosure. The heat engine is hermetically positioned in the enclosure filled with a certain pressure of gas. On the one hand, the working pistons in all cylinder assemblies operate under pressure, which helps to improve output power of the heat engine, and on the other hand, even if the piston has a little air leakage, the leaking gas is kept in the enclosure, thus the total gas will not reduce.

Figure 1:
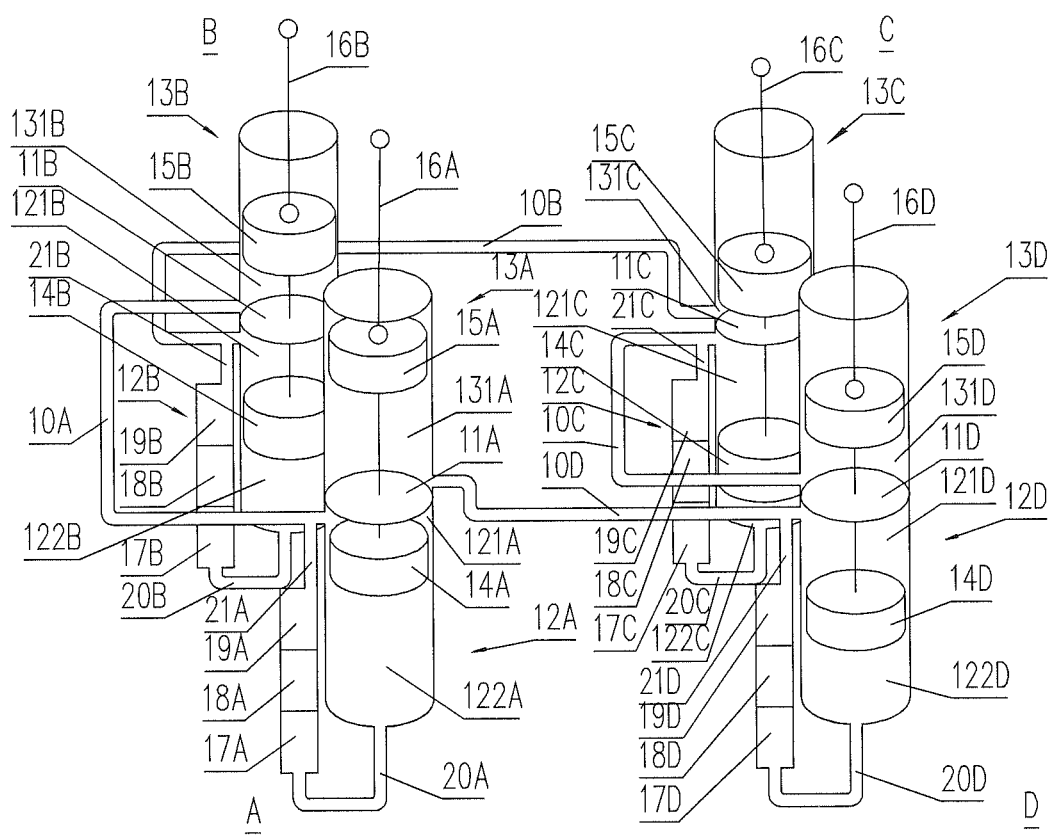
FIG. 1 shows a schematic view of four cylinder assemblies in the first traditional type of four-cylinder dual-piston coaxial ventilation heat engine.
Figure 1A:
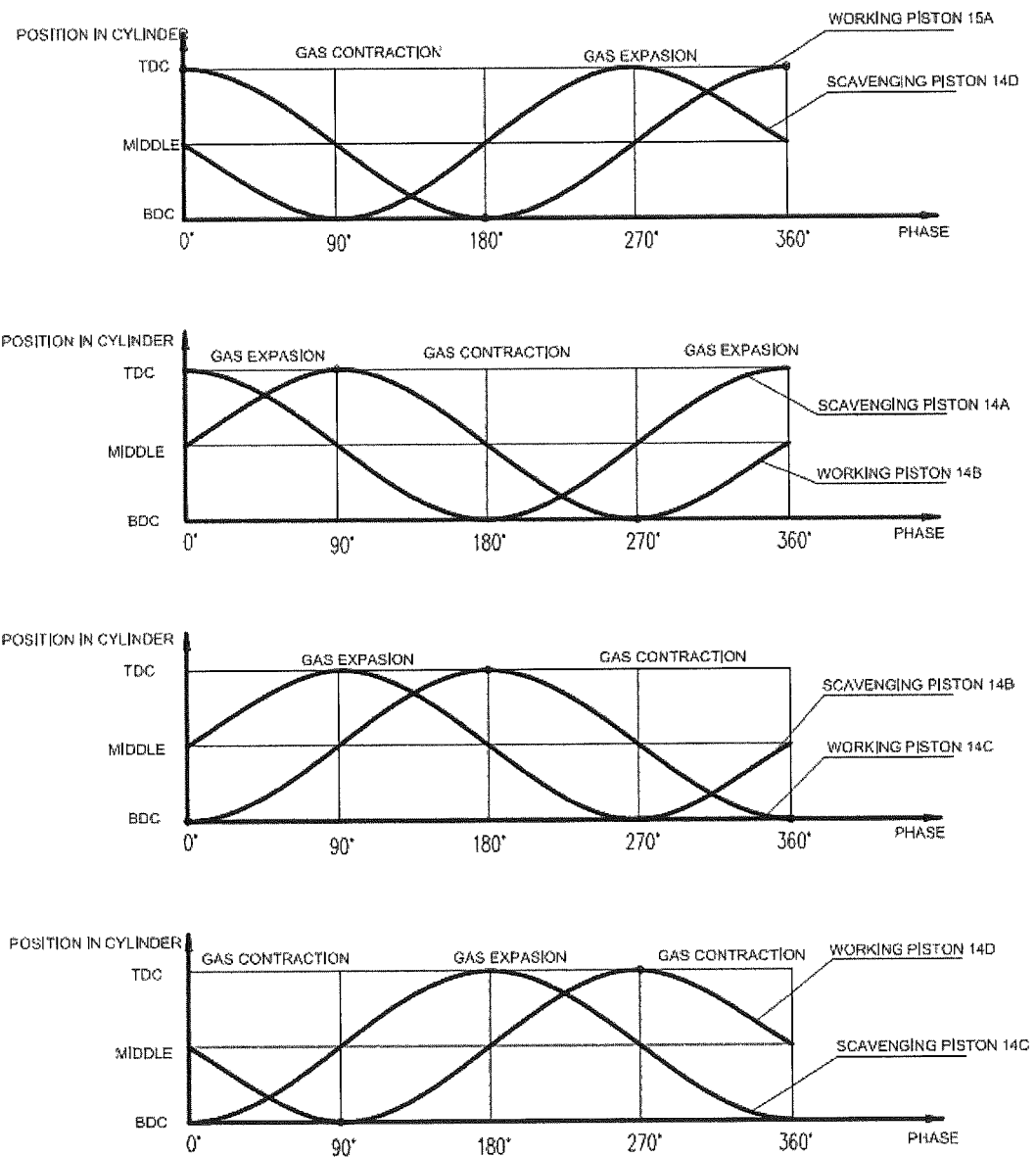
FIG. 1A is a principle diagram of the four-cylinder dual-piston coaxial ventilation heat engine shown in FIG. 1.
Figure 2:
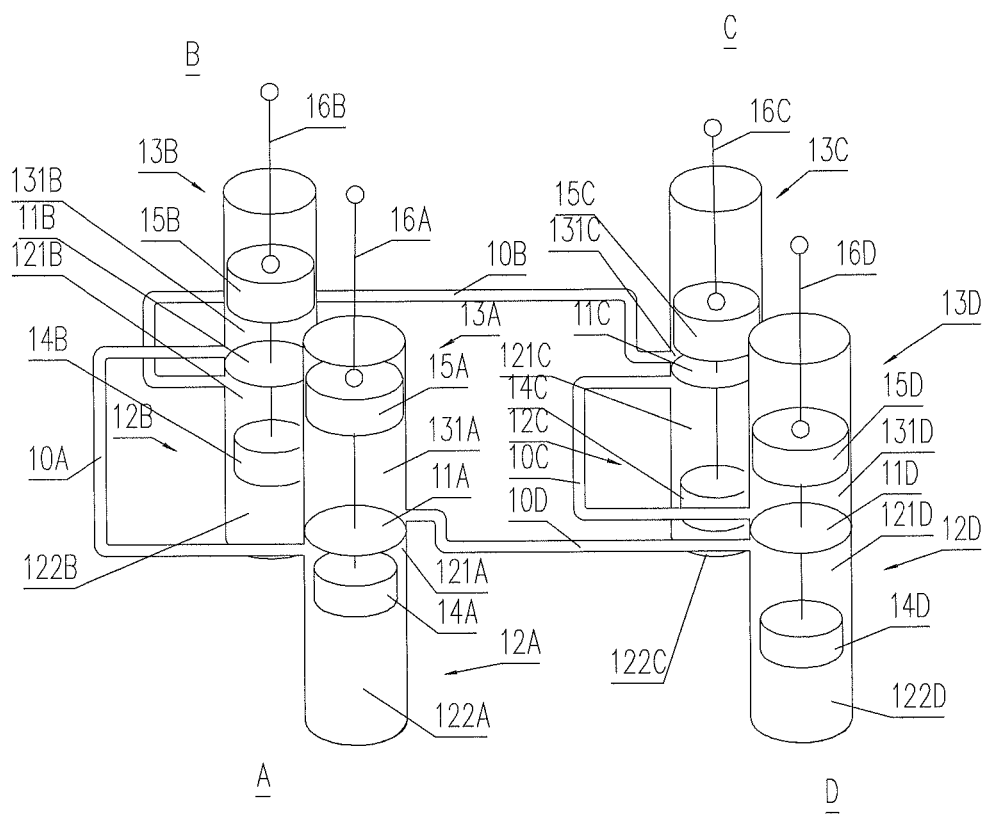
FIG. 2 shows a schematic view of four cylinder assemblies in the second traditional type of four-cylinder dual-piston coaxial ventilation heat engine.
Figure 3:
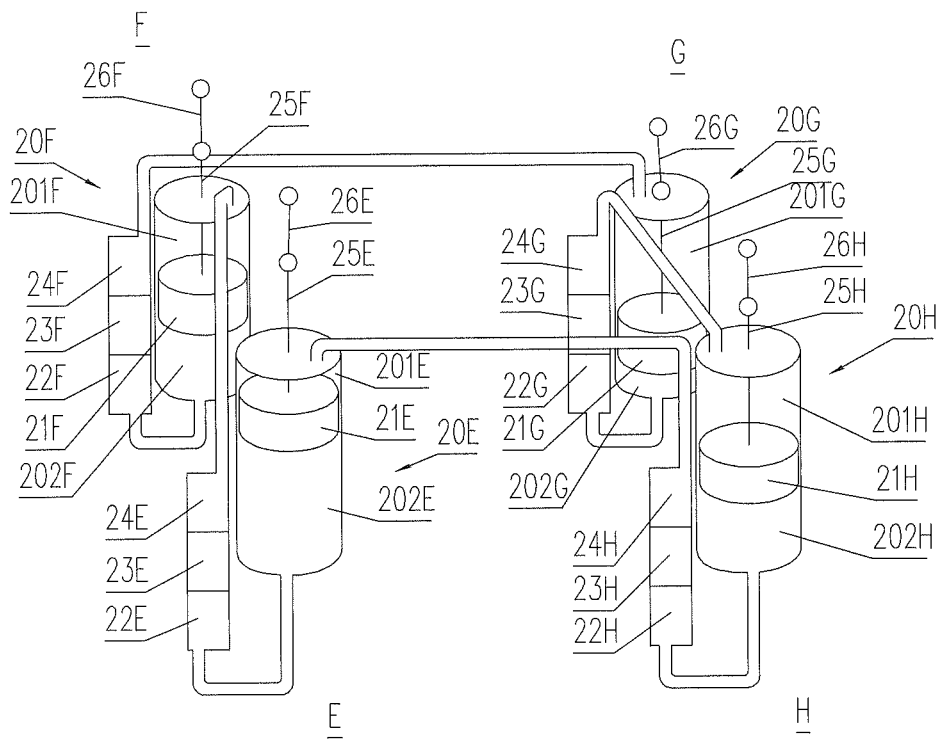
FIG. 3 shows a schematic view of four cylinder assemblies in the traditional double-acting heat engine.
Figure 3A:
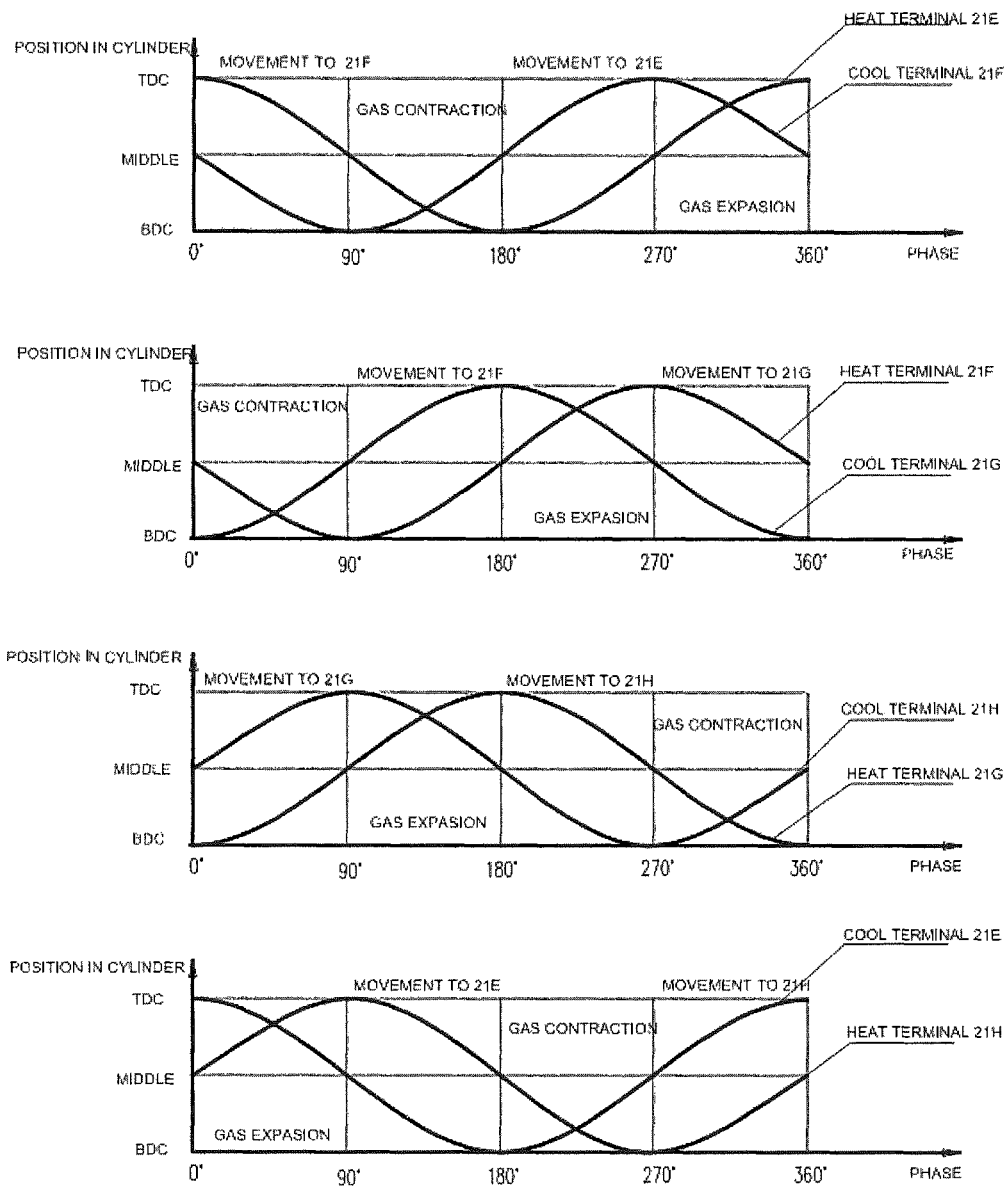
FIG. 3A is a function diagram of the double-acting heat engine shown in FIG. 3.
Figure 4:
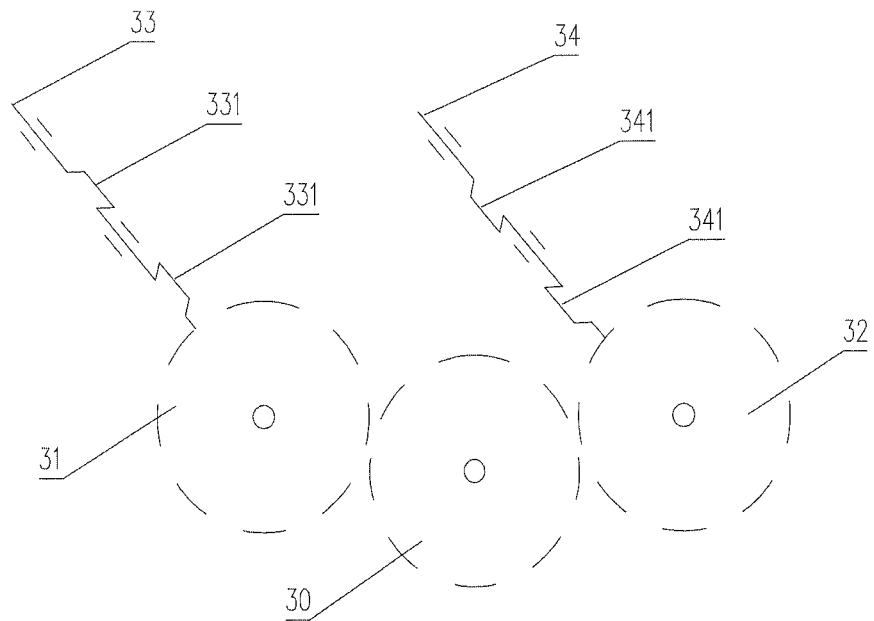
FIG. 4 shows a schematic view of the transmission output mechanism in the traditional heat engine.

In the heat engine of this embodiment, a four-cylinder dual-piston coaxial ventilation heat engine may be assembled by pivotally connecting the third, fourth, fifth and sixth hinged parts 421, 432, 521, 532 of the transmission output mechanism to four rods of four cylinder assemblies shown in FIG. 1. A four-cylinder dual-piston coaxial ventilation heat engine may be assembled by pivotally connecting the third, fourth, fifth and sixth hinged parts 421, 432, 521, 532 of the transmission output mechanism to four rods of four cylinder assemblies shown in FIG. 2. A double-acting heat engine may be assembled by pivotally connecting the third, fourth, fifth and sixth hinged parts 421, 432, 521, 532 of the transmission output mechanism pivotally connected to four rods of four cylinder assemblies shown in FIG. 3. The transmission output mechanism transmits the cycle power from the four cylinder assembly to the crankshaft and then to outside. Only consisted of a number of rods, the transmission output mechanism has simple structure and low manufacturing cost. In the meanwhile, no requirement to complex lubrication in operation will further reduce operation cost. Additionally, less noise is produced during the operation of the transmission output mechanism consisted of the rods.

Figure 8:
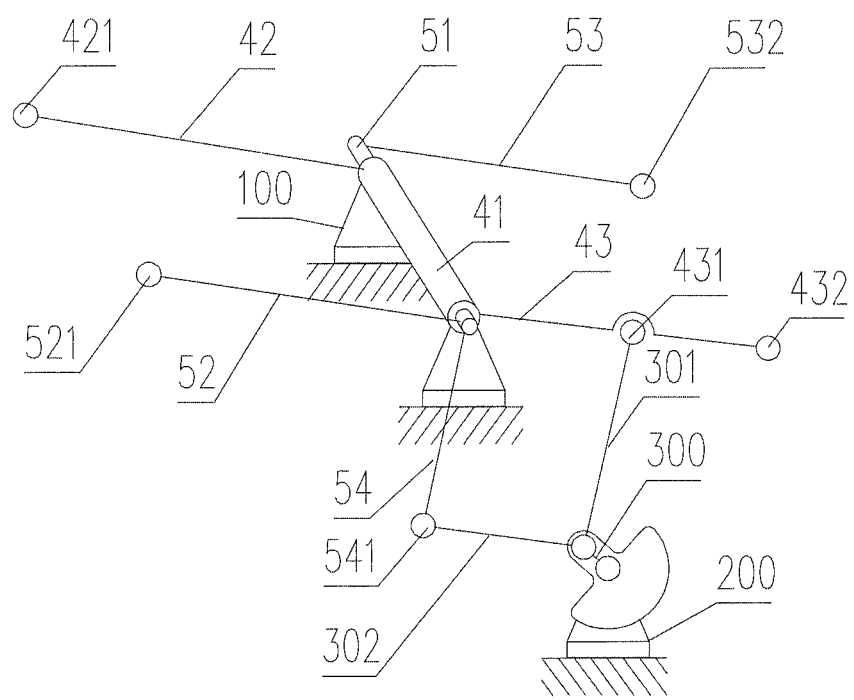
FIG. 8 shows a schematic view of a second embodiment of the transmission output mechanism of the heat engine in the present invention.

As shown in FIGS. 5, 6 and 8, the structure of the second transmission output mechanism is different from that of the first one in that: the first straight shaft 41 is a hollow tube rotatably sleeved onto the second straight shaft 51, two ends of the second straight shaft 51 extend out of the first straight shaft 41, which preventing from the interference between the fourth long arm 53, the third long arm 52, the short arm 54 fixed to two ends of the second straight shaft 51 and the first long arm 42, the second long arm 43 fixed to two ends of the first straight shaft 41 in operation. It is obvious that the second straight shaft 51 can be a hollow tube rotatably sleeved onto the first straight shaft 41, and two ends of the first straight shaft 41 extend out of the second straight shaft 51. Other structure of the second embodiment is the same as that of the first embodiment, and thus the description thereof is omitted for clarity.

INDUSTRIAL APPLICABILITY

In summary, the heat engine of the present invention has no special requirement for the heat source, and thereby is applicable to a wide range of fuel, for example, fluid fuel such as fuel oil and fuel gas, solid fuel such as fired coal and crop straw, factory waste heat, renewable energy, nuclear energy, geothermal energy, solar energy, heat energy resulting from sea temperature difference and even day and night temperature difference. When the solar energy is utilized as heat source, the efficiency can be high for no need of exhausting operation. The heat engine of the present invention can be widely utilized to drive the generator to generate electricity, the water pump to pump water, the compressor to refrigerate, the air fan to blow and the agricultural machine to operate.

It is to be understood that even though the preferred embodiments of the invention have been explained in the foregoing description, the disclosure about the preferred embodiments is just for illustrating the characteristics and spirits of the invention, not for limiting the claimed protection scope of the present invention. On the contrary, the disclosure is directed to include any changes or equivalents to the embodiments in the claimed protection scope of the present invention. Therefore, the claimed protection scope shall be interpreted to the full and broadest extent including all possible changes and equivalents.

What is claimed is:

1. A heat engine comprising four cylinder-assemblies and a transmission output mechanism for transmitting and outputting power, the transmission output mechanism comprising a rocker-arm shaft support, a crankshaft support, a first rocker-arm assembly, a second rocker-arm assembly, and a crankshaft rotatably mounted to the crankshaft support, further comprising a crankshaft long-arm connecting rod and a crankshaft short-arm connecting rod pivotally connected to the crankshaft;

the first rocker-arm assembly comprises a first straight shaft with a length approximately equal to a distance between centers of two adjacent cylinders, a first long arm and a second long arm respectively with a length equal to or longer than half length of the first straight shaft, wherein the first long arm and the second long arm are perpendicular to the first straight shaft and positioned at two sides of the first straight shaft, one end of the first long arm and one end of the second long arm are fixedly connected to two ends of the first straight shaft respectively and the other ends thereof are pivotally connected to two rods of two cylinder assemblies at one diagonal respectively, an angle between the first long arm and the second arm is in a range of 120 to 240 degrees, and the second long arm is provided with a first hinged part for pivotally connecting the crankshaft long-arm connecting rod;

the second rocker-arm assembly comprises a second straight shaft with a length approximately equal to a distance between centers of two adjacent cylinders, a third long arm and a fourth long arm respectively with a length equal to or longer than half length of the second straight shaft, and a short arm with a length equal to or shorter than half length of the second straight shaft, wherein the third long arm and the fourth long arm are perpendicular to the second straight shaft and positioned at two sides of the second straight shaft, one end of the third long arm and one end of the fourth long arm are fixedly connected to two ends of the second straight shaft and the other ends thereof are pivotally connected to two rods of two cylinder assemblies at the other diagonal respectively, an angle between the third long arm and the fourth arm is in a range of 120 to 240 degrees, one end of the short arm is in fixed connection with connection part of the third long arm and the second straight shaft, the other end of the short arm is provided with a second hinged part for pivotally connecting the crankshaft short-arm connecting rod;

a distance between the first hinged part of the first rocker-arm assembly and the first straight shaft is equal to that between the second hinged part of the second rocker-arm assembly and the second straight shaft;

the first straight shaft of the first rocker-arm assembly and the second straight shaft of the second rocker-arm assembly are parallel to each other and are rotatably mounted to the rocker-arm shaft support, the crankshaft long-arm connecting rod is parallel to the short arm, and the crankshaft short-arm connecting rod is parallel to the second long arm.

2. The heat engine of claim 1, wherein one of the first straight shaft and the second straight shaft is a hollow tube rotatably sleeved on the other thereof, two ends of the other thereof extending out of the hollow tube.

3. The heat engine of claim 1, wherein an angle between the first long arm and the second long arm is in a range of 160 to 220 degrees, an angle between the third long arm and the fourth long arm is in a range of 160 to 220 degrees.

4. The heat engine of claim 3, wherein the counterweight is located upon or under said rocker-arm assembly.

5. The heat engine of claim 3, further comprising a sealed enclosure filled with a certain pressure of gas, wherein the heat engine is positioned in the enclosure.

6. The heat engine of claim 1, wherein an angle between the first long arm and the second long arm is in a range of 160 to 220 degrees, an angle between the third long arm and the fourth long arm is in a range of 160 to 220 degrees.

7. The heat engine of claim 6, wherein the counter weight is located upon or under said rocker-arm assembly.

8. The heat engine of claim 6, further comprising a sealed enclosure filled with a certain pressure of gas, wherein the heat engine is positioned in the enclosure.

* * * * *